J. W. VAN METER.
METHOD OF DIFFUSING AND DISSEMINATING POISONOUS GASES.
APPLICATION FILED APR. 11, 1921.

1,401,292.  Patented Dec. 27, 1921.

INVENTOR
JAMES W. VAN METER

BY  Bradley L. Benson
ATTORNEY

UNITED STATES PATENT OFFICE.

JAMES W. VAN METER, OF SAN FRANCISCO, CALIFORNIA.

METHOD OF DIFFUSING AND DISSEMINATING POISONOUS GASES.

1,401,292.  Specification of Letters Patent.  Patented Dec. 27, 1921.

Application filed April 11, 1921. Serial No. 460,521.

*To all whom it may concern:*

Be it known that I, JAMES W. VAN METER, a citizen of the United States of America, residing at 2755 Clay street, city of San Francisco, in the county of San Francisco and State of California, have invented certain new and useful Improvements in Methods of Diffusing and Disseminating Poisonous Gases, of which the following is a specification.

The present invention is an improved method of diffusing chlorin and disseminating poisonous gases, and relates to operations employing chlorin, either alone or in combination with other chemical agents as for instance the production of chloro-cyanic or arsenical gases to be used in fumigation or insecticide operations, animal extermination and the like.

The primary object of the invention is to provide a means of diffusing chlorin and disseminating poisonous gases to render permeation more effective, to equalize the distribution of poisonous fumes over a given area and to provide carrying media for the killing agents used which will insure a greater kill with a given amount of chemical ingredients.

Other objects include the provision of a visible danger warning by means of a dense smoke which smoke also increases the efficiency of a gas such as cyanogen which is not visible and is highly poisonous, is very volatile evanescent, and easily affected by light.

Attention is directed to my copending application for patent, Ser. No. 407,073 wherein I disclose a method of liberating cyanogen, arsenical and other gases by the action of chlorin in the presence of metallic elements.

In the accompanying 1 sheet of drawings;

Figure 1 is a digrammatic view in elevation of an apparatus by which it is possible to carry out my method of diffusing chlorin and disseminating the same and other gases.

Fig. 2 is an enlarged detail of a chemical cartridge used in my process for diffusing chlorin and disseminating the same and other gases.

No claim is made on the apparatus here shown the same being made the subject matter of my copending applications for patents Serial No. 499,932, filed September 12, 1921—Serial No. 476,111, filed June 9, 1921; and Serial No. 407,073, filed August 31, 1920.

Referring to the drawings, Fig. 1, the numeral 1 indicates a chlorin cylinder of conventional type, provided with a service valve 2 adapted to release chlorin under pressure to a flexible conduit 3.

The figure represents a fumigation operation wherein a tree 4 is to be subjected to gaseous fumes for the purpose of destroying pests such as scale, aphis and similar parasites.

The prevailing practice in such operation is to cover the tree to be fumigated with a tent or similar cover 6 adapted to confine the gas to a limited area.

By my method the gases are liberated near the base of the tree by the passage of chlorin from conduit 3 through a previously prepared chemical cartridge 7 which is supported by a loop 8 on a staff 9 driven into the ground.

The conduit 3 at the end remote from the cylinder 2 engages a nipple 11 on a shell 12 which is provided with an internal bore tapered as indicated at 13 for removably engaging one end of the cartridge 7.

As before stated a chemical combustion is set up by the action of chlorin on metallic elements such as iron, arsenic, lead and zinc, in fine particles.

These elements indicated at 14 are distributed throughout the interior of the cartridge which is punctured at the top as indicated at 16 and at the bottom as shown at 17 to facilitate the entrance of chlorin and discharge of gases and fumes generated within the cartridge.

At 18 I show sawdust particles which I use for a number of reasons, one of which is the furnishing of the required degree of moisture and another the production of smoke. Other materials possessing similar physical qualities might be substituted with equally satisfactory results.

These particles 18 serve to separate the metallic particles (finely divided iron or the like) and prevent precipitation of the same within the cartridge in handling.

Furthermore the sawdust in the cartridge separates the metallic particles and keeps them scattered throughout the cartridge in a manner adapted to permit thorough access of the chlorin to the metallic particles and insures uniform progressive combustion.

The sawdust particles also contain moisture and being of an absorptive nature are convenient means of introducing moisture, I prefer to moisten the sawdust and then mix a quantity of oil such as linseed oil therewith as indicated at 20.

This increases the efficiency of the sawdust in separating the metallic elements 14 which adhere thereto.

The sawdust and the oil with which it is coated are easily combustible and form a dense smoke screen which is at once a visible danger warning and a carrying medium for any gases which may be contained therein.

Fumigation operations which employ cyanogen have heretofore been carried on mainly by night, whereas by my method it may be employed in daylight by using a smoke envelop which serves to exclude light.

Again the smoke carries a high percentage of carbon particles, and by reason of the intense heat generated at the time the smoke and carbon particles are liberated, these particles are impregnated with cyanogen (provided of course that cyanid has been included in the cartridge content) with the result that the cyanogen is released slowly from the carbon particles and the dissemination thereof is more uniform over a given area and obviously a smaller quantity of cyanid compound may be used.

I find in practice that several important objects are accomplished by the method herein disclosed aside from the economy of operation.

The even distribution of poison over the fumigated area and the retarding of the liberation of the said poison by the carbon and smoke carrying media are of essential importance, in that as the smoke settles upon the tree the cyanogen from the carbon particles and other residue is liberated in close proximity to the parasite or other life to be destroyed.

I find that it is of advantage to mix or coat the metallic particles with creosote or other suitable oil, as, aside from the advantages heretofore mentioned this preserves the said particles against rust or other deterioration without preventing the reaction with chlorin.

Another advantage of my method of diffusing chlorin is that it does away with expensive and cumbersome apparatus generally necessary for this purpose.

I claim;

1. The method of disseminating poisonous gases which consists in generating said gases by the reaction of chlorin or metallic elements, in the presence of combustible material adapted to create an envelop of smoke.

2. The method of diffusing and disseminating chlorin gas which consists in passing chlorin through finely divided metallic particles and combustible smoke producing matter containing moisture.

3. The method of diffusing and disseminating chlorin gas which consists in passing chlorin through finely divided metallic particles and combustible smoke producing matter containing moisture and oil.

4. That method of diffusing and disseminating poisonous gases which consists in passing chlorin through finely divided metallic particles evenly distributed throughout finely divided combustible material to which said metallic particles are held by an adhesive material.

5. The method of diffusing and disseminating poisonous gases which may be generated or vaporized by the action of chlorin on metallic substances, which consists in creating by said action an envelop of smoke from combustible materials mixed with the elements of said gases volatilized by said action.

In testimony whereof I affix my signature.

JAMES W. VAN METER.

Certificate of Correction.

It is hereby certified that in Letters Patent No. 1,401,292, granted December 27, 1921, upon the application of James W. Van Meter, of San Francisco, California, for an improvement in "Methods of Diffusing and Disseminating Poisonous Gases," an error appears in the printed specification requiring correction as follows: Page 2, line 57, claim 1, for the word " or " read *on;* and that the said Letters Patent should be read with this correction therein that the same may conform to the record of the case in the Patent Office.

Signed and sealed this 20th day of June, A. D., 1922.

[SEAL.]  KARL FENNING,
*Acting Commissioner of Patents.*